United States Patent [19]

Guenther, Jr. et al.

[11] Patent Number: 4,772,998

[45] Date of Patent: Sep. 20, 1988

[54] ELECTROSTATIC PRECIPITATOR VOLTAGE CONTROLLER HAVING IMPROVED ELECTRICAL CHARACTERISTICS

[75] Inventors: Robert N. Guenther, Jr., Mount Holly; Hardey Singh, Robinsville, both of N.J.

[73] Assignee: NWL Transformers, Bordentown, N.J.

[21] Appl. No.: 19,031

[22] Filed: Feb. 26, 1987

[51] Int. Cl.[4] ........................ H02M 7/155; B03C 3/68

[52] U.S. Cl. .................................... 363/128; 323/903; 55/2; 55/105

[58] Field of Search .................................... 363/66–68, 363/124, 128; 323/903; 307/252 C, 252 L, 252 M, 252 UA, 252 T; 55/2, 101, 105

[56] References Cited

U.S. PATENT DOCUMENTS

| | | | |
|---|---|---|---|
| 2,961,577 | 11/1960 | Thomas et al. | 55/105 |
| 3,039,252 | 6/1962 | Guldemond et al. | 55/105 |
| 3,745,749 | 7/1973 | Gelfand | 55/105 |
| 3,772,853 | 11/1973 | Burge et al. | 55/105 |
| 4,138,232 | 2/1979 | Winkler et al. | 55/105 |
| 4,152,124 | 5/1979 | Davis | 55/105 |
| 4,326,860 | 4/1982 | Laugesen | 55/105 |
| 4,390,830 | 6/1983 | Laugesen | 55/105 X |
| 4,522,635 | 6/1985 | Matts | 55/2 |
| 4,648,887 | 3/1987 | Noda et al. | 55/2 |

OTHER PUBLICATIONS

Toshiba Gate Turnoff Thyristors–Product Literature, Toshiba Corporation, pp. 1–25.

"Gate Turn–Off Thyristors: Their Properties and Applications", W. Bosterling, AEG–Telefunken Corp. Preliminary Technical Information, Oct., 1983.

"Application of Gate, Turn–Off Thyristors in 460–V, 7.5–250–hp AC Motor Drives", IEEE Transactions on Industry Applications, vol. IA–19, No. 4, Jul./Aug., 1983.

"Applying International Rectifier's 160PFT Type Gate Turn–Off Thyristors", Akira Honda, International Rectifier Application, Note–315.

*Primary Examiner*—Patrick R. Salce
*Assistant Examiner*—Emanuel Todd Voeltz
*Attorney, Agent, or Firm*—Ratner & Prestia

[57] ABSTRACT

A control system for controlling high power from an AC source for electrostatic precipitators. The AC power is gated both on and off during the same half-cycle of the AC sources. The gating off of the AC power occurs at a time substantially different from the time of the zero crossings of the AC source. The AC source may be gated on and off respectively before and after each peak to provide high voltage to the precipator electrodes while the period of such pulsing is kept short enough to prevent arcing. Additionally, the source may be gated on after one peak and gated off before the next peak, thereby providing high voltage to the electrodes without applying the peak voltage of the AC. Further in accordance with the invention, such gating may be performed using gate turn-off thyristors. The pulses may be symmetric about the peaks or about the zero-crossings of the source. The source may also be gated on and off a plurality of times during each half cycle.

32 Claims, 6 Drawing Sheets

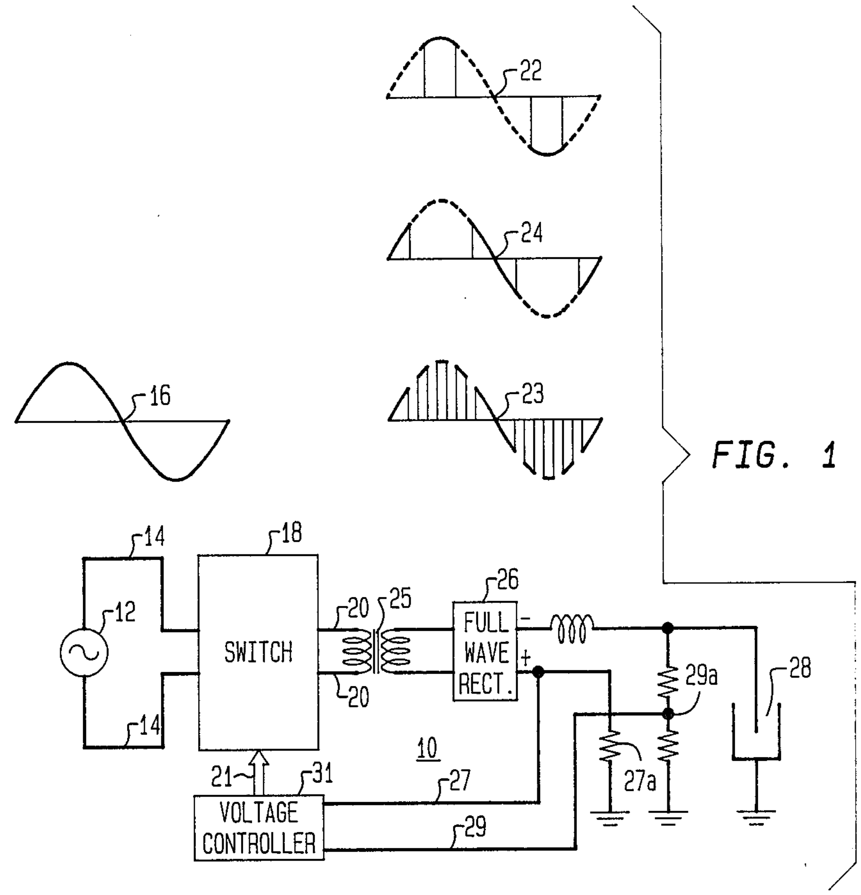
FIG. 1
FIG. 3
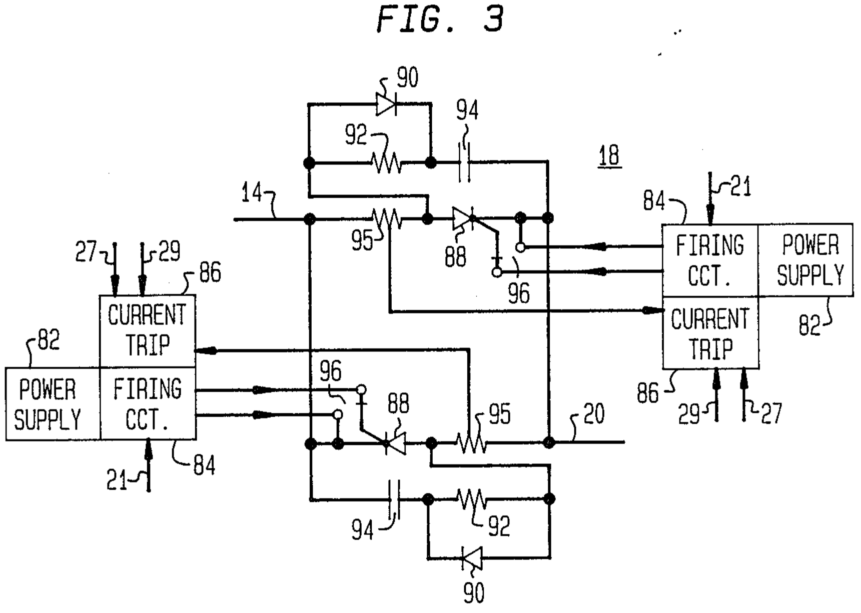

ELECTROSTATIC PRECIPITATOR VOLTAGE CONTROLLER HAVING IMPROVED ELECTRICAL CHARACTERISTICS

BACKGROUND OF THE INVENTION

A. Field of Invention

The present invention relates to controlling a high power alternating source for an electrostatic precipitator.

B. Background Art

It is known in the art to control an AC energy source for electrostatic precipitators using silicon control rectifiers (SCR). See for example Laugesen U.S. Pat. Nos. 4,326,860 and 4,390,830.

In this prior art a turn-on signal was applied to the gate of the SCR to turn the SCR on, usually after the peak of a half-cycle, and energy was applied to the electrodes of the electrostatic precipitator by way of the SCR. See, for example, the prior art waveform shown in FIG. 2E or SCR Manual, Fifth Edition, General Electric Company, Chapter 9 (AC Phase Control).

Since the current through an SCR must be decreased to substantially zero to turn the SCR off, after the SCR was turned on energy was supplied to the electrodes for the remainder of the half-cycle during which the SCR was turned on. Thus the SCR could control the energy from one end of the AC half-cycle only in the direction indicated by the arrows of FIG. 2E.

The SCR was usually turned on after the peak of a half-cycle because arcing of the electrodes is most likely at the peak of the AC signal. This delay in turning the SCR on avoided applying energy to the electrodes during the portion of the half-cycle most likely to cause arcing.

However, this also resulted in poor utilization of the waveform, since the portion of the half-cycle between a zero-crossing and a peak could not be applied to the electrodes. This was so because the turn-off time of the SCR was too long to turn an SCR on in the portion of the half-cycle before the peak and reliably turn it off before the peak to prevent arcing. See for example SCR Manual, Fifth Edition, General Electric Company, page 123 for a list of parameters which affect the turn off time of SCR's. Forced commutation circuits to accomplish this type of turn off were very complex and extremely expensive.

Additionally, the harmonic content and the DC ripple of the pulses produced in these SCR power supplies for electrostatic precipitators were objectionable when this arrangement was used because of the way that the DC waveform was chopped, especially with high current loads.

Furthermore, because it was difficult to turn off the SCR, it was difficult to terminate the supply of energy to the electrodes quickly under arcing or other emergency conditions. A further problem associated with shutdown upon arcing or other emergency shutdown was that this type of sudden shut-down a large amount of energy to be dumped into the precipitator, stressing precipitator components.

In addition to these difficulties, since the voltage rose during the early portions of the half-cycle before the SCR was turned on to supply current to the load, the voltage and current were out of phase resulting in a poor power factor.

It has also been known in the prior art to use gate turn-off thyristors (GTO) to operate from a DC voltage rail to obtain a variable frequency AC output. See for example, "Gate Turn-Off Thyristors: Their Properties and Applications", W. Bosterling, H. Ludwig, R. Schimmer, M. Tscharn; AEG-Telefunken, Primary Technical Information, October, 1983. However, this method was not useful for ESP technology because it would have to be applied to the energy supply after step-up and rectification where the voltage level is in the range of one hundred to two hundred kilovolts.

SUMMARY OF THE INVENTION

A control system for controlling high power from an AC source for electrostatic precipitators. The AC power is gated both on and off during the same half-cycle of the AC source. The gating off of the AC power occurs at a time substantially different from the time of the zero crossings of the source. The AC source may be gated on and off respectively before and after each peak to provide high voltage to the precipitator electrodes while the period of such pulsing is kept short enough to prevent arcing. Additionally, the AC source may be gated on after one peak and gated off before the next peak, thereby providing high voltage to the electrodes without applying the peak voltage of the AC. Further in accordance with the invention, such gating may be performed using gate turn-off thyristors. In another embodiment gate turn-off thyristors are used to shape AC waveforms.

BRIEF DESCRIPTION OF THE DRAWINGS

FIG. 1 is a block diagram of a preferred embodiment of the electrostatic precipitator control system invention;

FIG. 3 is a circuit diagram of the preferred embodiment of the switch of the present invention;

DETAILED DESCRIPTION OF THE INVENTION

Figures 2A, 2B, 2C, 2D, 2E:
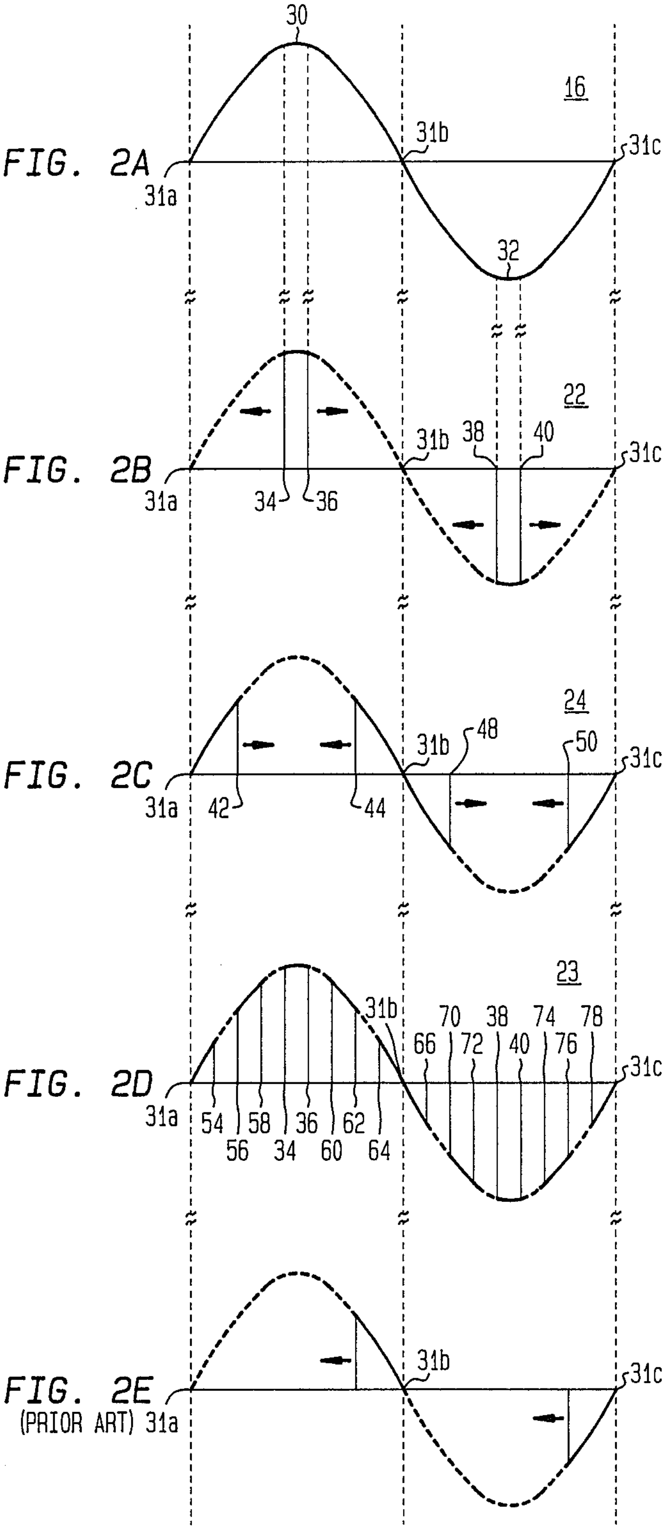
FIG. 2E (PRIOR ART)
FIG. 2A–2D are idealized illustrations of the waveforms for precipitator control in the system of FIG. 1.
FIG. 2E is a prior art waveform showing shutoff during zero crossing.

Referring now to FIG. 1 there is shown electrostatic precipitator (ESP) system 10. System 10 includes a high power alternating source 12 which applies AC signal 16 to switch 18 by way of lines 14. The power provided by high power source 12 may be in the range of five kilowatts to two hundred fifty kilowatts. Switch 18 receives AC signal 16 and shapes AC signal 16 into pulses such as pulses 22 (mode A), pulses 23 (mode C), or pulses 24 (mode B). Pulses 22,23,24 are applied to transformer 25 by way of lines 20 and thereby to full wave rectifier 26. Rectified voltage is then applied to electrodes 28.

Referring now to FIG. 3, there is shown a more detailed representation of switch 18 including gate turn-off thyristors (GTO) 88 which are connected in antiparallel. GTO's 88 operate during opposite polarities of signal 16 and have the ability to block reverse voltage as described in International Rectifier Aplication Notes AN-315 "Applying International Rectifiers 160 PFT Type Gate Turn-Off Thyristors". Each GTO 88 is controlled at its respective gate control terminals 96 by a respective firing circuit 84 and current trip 86 which cause GTO's 88 to be turned on and off as required to produce pulses 22, 23, 24. Details of voltage controller 31, which produces timed signals as required for pulses 22, 23, 24, are set forth below.

Because GTO's 88 may be turned off quickly they may be used to chop up signal 16 and produce the high voltage waveforms applied to electrodes 28 by way of lines 20 as compared with conventional control using silicon control rectifiers which could only be reliably turned off by a reversal of supply current, usually at a zero-crossing, or forced to turn off by commutating circuits.

Damping resistors 92, charging diodes 90 and capacitors 94 provide conventional directionally controlled snubber circuits for GTO's 88. During turn off of a GTO 88 when a negative voltage is provided from the gate to the cathode of a GTO 88, current to the load is diverted to the snubber circuit. During these conditions it is desired to charge capacitors 94 as quickly as possible to more quickly stop current to the load. Thus forward biased diodes 90 are provided in order to by-pass resistors 92. When the GTO 88 is turned back on, diodes 90 are back biased and current from capacitors 94 pass through resistors 92.

Conventional power supplies 82 provide power for firing circuits 84 as well as current trip circuits 86 which permit GTO's 88 to be turned off very quickly during the shaping of pulses 22, 23, 24 as well as during arcing of electrodes 28. Supplies 82 may provide 0, +5, and +15 volts. Current trips 86 are also conventional.

Switch 18 may gate signal 16 through to lines 20 to produce pulses 22 by turning on shortly before the peaks of signal 16 and turning off shortly after the peaks of signal 16. Pulses 22 are preferably symmetric about the peaks of signal 16. Because the likelihood of arcing at electrodes 28 is highest at the peaks of signal 16, the duration of pulses 22 is kept shorter than the amount of time required for electrodes 28 to arc. This permits high peak voltages to be applied to electrodes 28 while preventing electrodes 28 from arcing. This is useful in systems in which high voltage at electrodes 28 is required because of the resistivity of the particles being precipitated. pitated.

Switch 18 provides pulses 24 by turning on a predetermined period of time after each peak of signal 16 and turning off a predetermined period of time before the next peak of signal 16. This predetermined period of time may be lengthened, causing the turn-on and turn-off times to move outwardly from the zero crossings, in order to apply a desired average DC to electrodes 28 without causing the increased risk of arcing associated with applying the peak voltages of signal 16 to electrodes 28. Higher average DC results in increased precipitator efficiency.

Furthermore, switch 18 may provide pulses 23 by combining pulses such as pulses 22, 24. Thus, pulses 23 may contain portions in which energy is gated on around each peak of signal 16 as previously described for pulses 22 as well as portions in which energy is gated on after one peak and gated off before the next peak as previously described for pulses 24. Additionally, to provide higher average DC, further energy may be provided by pulses 23 by further gating of switch 18 between the pulses described for pulses 22, 23 as will be described in detail below.

Referring now to FIGS. 2A–D, there is shown in more detail signal 16 as well as pulses 22, 23 and 24. Signal 16, provided by supply 12, typically is in the range of 440 to 575 volts AC and has peaks 30, 32 and zero-crossings *31a,b,c*. Pulses 22, 23, 24, after the output of switch 18 has been applied to transformer 25, and may be in the range of five kilowatts to over two hundred and fifty kilowatts. Pulses 22, 23, 24 may have a peak DC voltage in the range of ninety to one-hundred fifty kilovolts while the RMS voltage on the primary side of transformer 25 may be in the range of four hundred forty to six hundred volts. Thus first the switching is performed on the alternating source voltage and the voltage is then stepped up and rectified.

Pulses 22 (mode A) are provided by causing switch 18 to turn on at time 34 and to turn off at time 36 preferably by means of GTO 88. The time difference between turn-on time 34 and the time of peak 30 may be selected to be equal to the time difference between the time of peak 30 and turn-off time 36. Thus, the pulse produced when switch 18 is in mode A, which turns on at time 34 and off at time 36, may be symmetrical about the positive-going peak 30 of signal 16.

Likewise, switch 18 turns on at time 38 and turns off at time 40 in which times 38, 40 may be selected to cause a pulse 22 which is symmetrical about the time of negative-going peak 32 of signal 16.

The total time difference between turn-on time 34 and turn-off time 36 in mode A, as well as the total time difference between turn-on time 38 and turn-off time 40, may be as short as permitted by circuit parameters (typically fifty to seventy-five microseconds) or as wide as the entire half cycle of signal 16. In general, these durations are selected to be short enough to prevent electrodes 28 from arcing. In high resistivity particle environments, it is often desired that a high DC value be provided to electrodes 28 while still preventing electrodes 28 from arcing. An example of such a high resistivity environment is precipitation of some types of coal dust.

Times 34, 36, as well as times 38, 40, may be adjusted outwardly from the times of peaks 30, 32, as shown by the directions of the arrows of FIG. 2B, to provide greater average DC to electrodes 28 while stopping short of a pulse width which would cause electrodes 28 to arc.

Referring now to FIG. 2C, there is shown in more detail pulses 24 (mode B). To provide pulses 24, switch 18 is turned on at time 44 and turned off at time 48. During the time between times 44, 48, signal 16 passes through zero-crossing *31b*. Because switch 18 is designed to include GTO's 88 rather than silicon controlled rectifiers, shutoff of power to electrodes 28 at a the zero-crossing is prevented. An example of such a shutoff during the zero-crossing, which is avoided in the present invention, is shown in the prior art waveform of FIG. 2E. (For simplicity, the waveform of FIG. 2E is shown as if the load supplied with energy is purely resistive). Pulses 24 may continue after the zero-crossing by firing the GTO 88 of the opposite polarity because the portion of pulse 24 thus produced may then be terminated before the next peak of signal 16 by GTO 88 control circuits 84, 86. Thus control of the turn-off point of individual GTO's 88 permits complete control of termination of pulses 24 to maintain equal volt-seconds for each segment of each pulse of pulses 24 as well as equal volt-seconds for each pulse of pulses 24.

Switch 18 thus causes signal 16 to be gated off from time 48 until time 50. At time 50, switch 18 gates signal 16 on again as previously described for time 44. The pulse produced when switch 18 turns on at time 50 continues past zero-crossing 31*c* into the next half-cycle (not shown) of signal 16 until switch 18 is again turned off. Similarly, in a half-cycle (not shown) prior to zero-crossing 31*a*, switch 18 is turned on. Switch 18 is then turned off at time 42 in the manner previously described for time 48.

The average DC of pulses 24 when switch 18 is operating in mode B may be increased by adjusting times 42, 44, 48, 50 in the direction indicated by the arrows of FIG. 2C. For example, a GTO 88 may be turned on before time 44 and turned off after time 48. Thus, the utilization of signal 16 may be increased without applying energy to electrodes 28 at peaks 30, 32 of signal 16. Times 42, 44 may be symmetric about the time of peak 30 and times 48, 50 may be symmetric around the time of peak 32.

Referring now to FIG. 2D, pulses 23 (mode C) are produced by applying the techniques used to produce pulses 22, 24. For example, by turning switch 18 on at time 64 and off at time 66, a pulse similar to pulses 24 is produced in which switch 18 turned on at time 44 and off at time 48 as previously described. Likewise, turning switch 18 off at time 54 ends a pulse similar to pulses 24 in a manner similar to that described for time 42 of FIG. 2C, and turning switch 18 on at time 78 begins a pulse in a manner similar to that described for turning switch 18 on at time 50.

Symmetric to positive-going peak 30, switch 18 may be turned on at time 34 and off at time 36 within pulses 23 in a manner similar to that previously described for pulses 22. Likewise, during the negative half-cycle of signal 16, switch 18 may turn on at time 38 and off at time 40 when operating in mode C to produce a portion of pulse 23 in a manner similar to that described for pulses 22.

Thus, pulses 22, 24 may be combined by having switch 18 gate signal 16 on and off a plurality of times during each half cycle. Additionally, switch 18 may be turned on at time 56 and off at time 58 in the same manner as previously described for times 34, 36. Likewise, switch 18 may be turned on at time 60 and off at time 62, on at time 70 and off at time 72, and on at time 74 and off at time 76 to provide additional portions of pulses 23. A plurality of such pulses may be provided between pulses 22, 24 when combining pulses 22, 24 as required for the optimum operation of system 10. Thus each GTO 88 may be fired several times within the half-cycle that it is forward biased. This is useful when impedance matching system 10. The turn-off current of switch 18 when providing pulses 22, 23, 24 may be aproximately 600 amps.

Thus it will be understood by those skilled in the art that pulses 22,24 may be combined to form pulses such as pulses 23. Pulse 23 are a direct combination of pulses 22,24.

Figure 4:
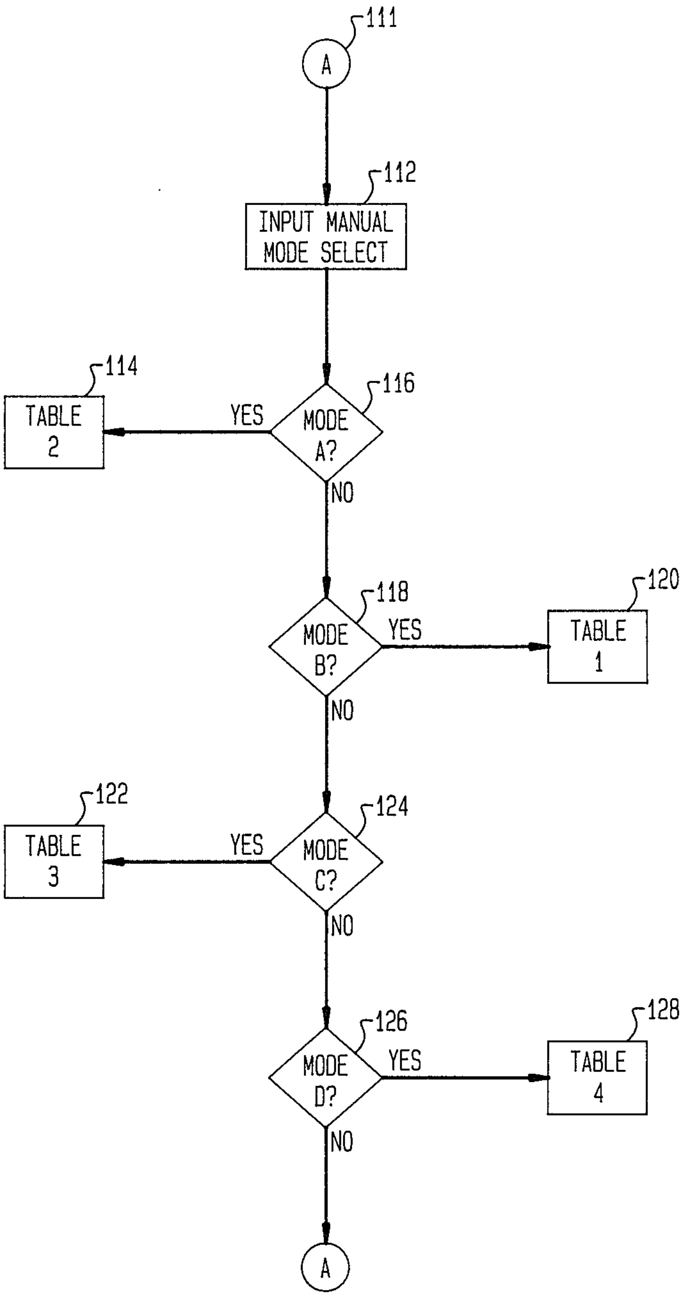
FIG. 4 is a flowchart representation of a method for selecting a mode of operation for the invention of FIG. 1.

Referring now to FIG. 4 there is shown a flow chart for selecting one of a plurality of programs for providing pulses 22 (mode A), pulses 24 (mode B), and pulses 23 (mode C). Each of the programs is set forth in a table below in a structured format understandable to those skilled in the art.

Each mode, A, B, C, or D may be manually input as shown in block 112. If mode A is manually selected, as determined at decision 116, execution proceeds through the program of Table 2 as shown in block 114. If mode B is manually selected, as determined at decision 118, execution proceeds to the program of Table 1 as shown in block 120. If mode C is manually selected, as determined at decision 124, execution proceeds to the program of Table 3 as shown in block 122. If mode D is selected, as determined in decision 126, execution proceeds to the program of Table 4 as shown in block 128. Mode D is a mixed mode which permits variable selection of one of the preceding modes A, B, C by the main program from cycle to cycle. It will be understood by those skilled in the art that the waveforms formed by the programs of Tables 1,2,3 may be described in either an inverted form or a non-inverted form. For example the program of Table 3 provides a waveform which is the inverse of that shown as pulses 23.

Table I

```
05 FOR N=0 TO 1
10 ON PULSE (EN) FOR X DEGREES
20 AT X DEGREES, OFF PULSE (EN) FOR
   (180-2X) DEGREES
30 ON PULSE (EN) FOR BALANCE OF HALF
   CYCLE
40 NEXT N
50 READ NEW X FROM MAIN PROGRAM
55 IF X=0, RETURN TO MAIN PROGRAM
60 GOTO 05
```

Table 2

```
95 FORN=0 TO 1
100 OFF PULSE (EN) FOR X DEGREES
200 AT X DEGRESS ON PULSE (EN) FOR
    (180-2X) DEGREES
300 OFF PULSE (EN) FOR BALANCE OF HALF
    CYCLE
400 NEXT N
500 READ NEW X FROM MAIN PROGRAM
505 IF X=0, RETURN TO MAIN PROGRAM
600 GOTO 95
```

Table 3

```
1145 FOR N=0 TO 1
1150 A=90/(Y+Z): I=INT(A)
1160 FOR N1=0 TO (I-1)
1165 OFF PULSE (EN) FOR Z DEGRESS
1170 ON PULSE (EN) FOR Y DEGREES
1175 NEXT N1
1180 OFF PULSE (EN) UNTIL 90+(A-I) DE-
     GREES
1200 FOR N2=0 TO (I-1)
1205 ON PULSE (EN) FOR Y DEGRESS
1210 OFF PULSE (EN) FOR Z DEGREES
1215 NEXT N2
1300 NEXT N
1400 READ NEW Y, NEW Z FROM MAIN PRO-
     GRAM
1450 IF Y=0 AND Z=0, RETURN TO MAIN PRO-
     GRAM
1460 GOTO 1145
```

Table 4

```
2000 READ MODE$ FROM MAIN PROGRAM
2005 IF MODE$=A, GO TO 05
2010 IF MODE$=B, GO TO 95
2015 IF MODE$=C, GO TO 1145
2020 IF MODE$=0, RETURN TO MAIN PROGRAM
2025 GOTO 2000
```

Figure 5:
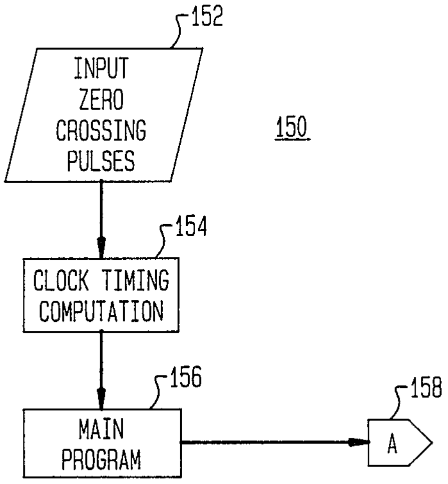
FIG. 5 is a flowchart representation of a method for synchronizing the waveforms of the invention of FIG. 1 with supply signal zero crossings.

Referring now to FIG. 5, routine 150 for synchronizing pulses 22, 23, 24 with the zero crossings of signal 16 is shown. A conventional zero crossing detector (not shown) is used in system 10 for detecting the zero crossings of signal 16, such as 31*a*, 31*b*, 31*c*. This conventional zero crossing detector outputs a pulse (not shown) at each zero crossing of signal 16.

The zero crossing pulses are received in input block 152 and clock timing computations are performed in block 154. These timing computations may include for example a computation of the time between time 34 and time 36 or between time 38 and time 40 when system 10 is in mode A.

The computations which are used in the program of Table 2 determine the value of X which represents the period of time between zero crossing 31*a* and time 34. In Table 1, X represents the period of time between zero-crossing 31*a* and time 42. In Table 3, Z represents the period of time between zero-crossing 31*a* and time 54 while Y represents the period of time between time 54 and time 56.

Thus, in blocks 154,156 turn-off time 42 and turn-on time 44 are determined when system 10 is in mode B and these times are used in the program of Table 2. Thus, the time periods required for producing pulses 22, 23, 24 are produced and synchronized with signal 16 in blocks 154,156. The main program of block 156 analyzes feedback variables from the transformer/rectifier set and ESP electrodes 28 in determining optimum values of X, Y, and Z. In an alternate embodiment of system 10, timing computation 154 may be performed by hardware (not shown).

Voltage controller 31, which executes the main program receives feedback by way of current feedback line 27 and voltage feedback line 29. By sensing the voltage across resistor 27*a*, current feedback line 27 provides a signal representative of the current through electrodes 28. By sensing the voltage across electrodes 28, divided down by voltage divider 29*a*, voltage feedback line 29 provides a signal representative of the voltage across electrodes 28.

The determinations made in accordance with the feedback signals of lines 27, 29 may be determinations such as those set forth in U.S. Pat. Nos. 4,326,860 and 4,390,830 which are herein incorporated by reference. These determinations, in addition to being used to shape pulses 22, 23, 24, may be used by voltage controller 31 to provide emergency shutdown of energy to electrodes 28, for example during arcing. Furthermore, voltage controller 31 may adjust timing periods, such as periods X, Y, and Z, to tailor and fine tune pulses 22, 23, 24 to the specific parameters of a particular electrostatic precipitator and the materials being precipitated.

Execution then proceeds from flowchart 150 by the way of off-page connector 158 to the on-page connector 111 of FIG. 4 to the program to select mode A, B, C, D as previously described.

Figure 6:
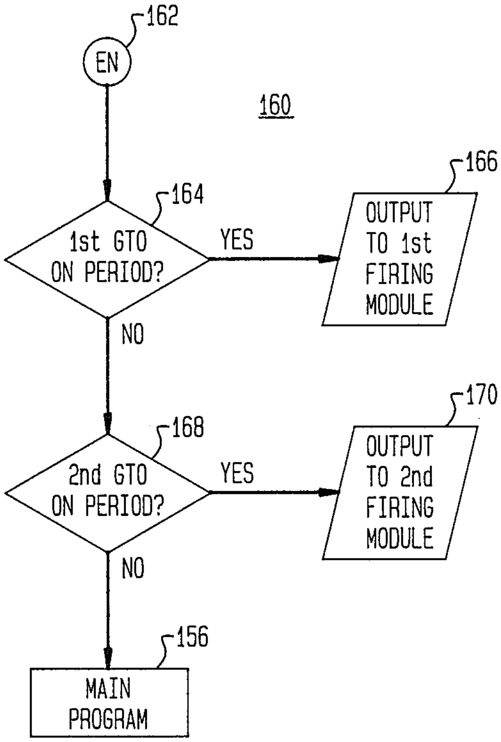
FIG. 6 is a flowchart representation of a method for determining which of a plurality of gate turn-off thyristers in the circuit of FIG. 3 should fire.

Referring now to FIG. 6, enable routine 160 is shown. As previously described, the programs of Tables 1–3 enable the firing of GTO's 88 to shape pulses 22, 23, 24. GTO's 88 therefore must be enabled when, for example, instructions 10, 20 of Table 1 are executed or instructions 100, 200, 300 of Table 2 are executed. When any of these instructions is executed, or any of the instructions of Table 3 whcch turn GTO's 88 on or off are executed, enable routine 160 is executed.

It will be understood by those skilled in the art that the pulses produced by the PULSE (EN) instructions of Tables 1–3 to cause firing of a GTO 88 may be logically inverted. It will be further understood that the processor of voltage controller 31 (not shown) executing the programs may produce these pulses. Furthermore, the operations shown in Tables 1–3 and in FIGS. 4–6 in software form may be implemented using hardware such as conventional logic circuits (not shown).

Execution of enable routine 160 begins when a PULSE (EN) instruction is executed by way of on-page connector 162 and in decision 164 determination is made whether signal 16 is in the on period of the first GTO. Each GTO 88 of switch 18 has an on period during one of the half cycles of signal 16.

If a determination is made that signal 16 is in the on period of the first GTO 88, execution proceeds to output block 166 in which an output is transmitted to the first firing module by way of control bus 21, for example a firing module 84 as shown in switch 18. If signal 16 is not in the on period of the first GTO 88, signal 16 must be in the on period of the second GTO 88 as determined at decision 168. When signal 16 is in the on period of the second GTO 88 execution proceeds to block 170 in which an output to the second firing module 84 is provided by way of control bus 21. Modules 86, which sense current through GTO's 88 by way of current sensing elements 95, may also cause firing circuits 84 to turn off GTO's 88 independently of controller 31. Current sensing elements 95 may comprise resistors, current transformers (not shown) and Hall effect devices (not shown).

Figure 7:
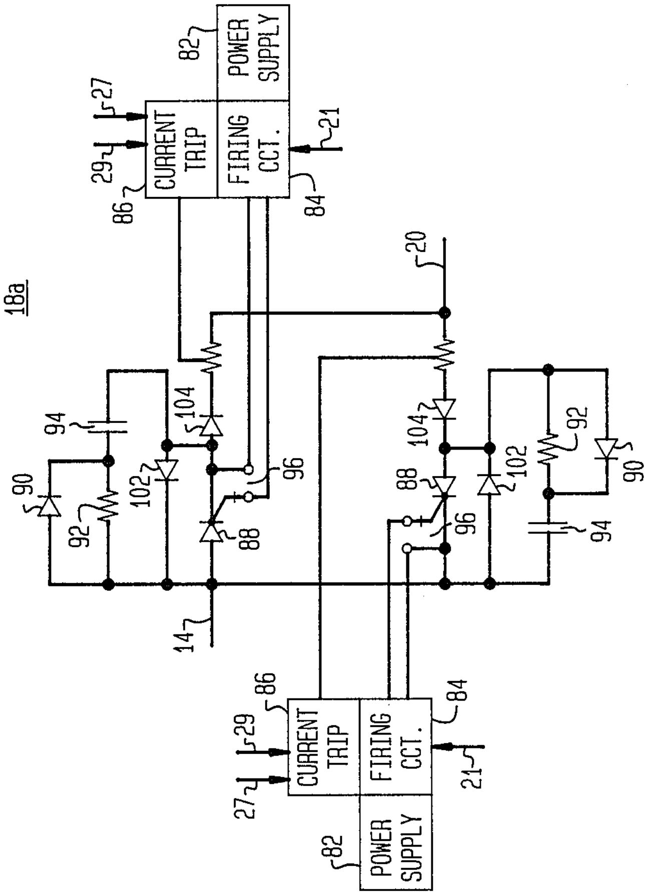
FIG. 7 is an alternate embodiment of the circuit of FIG. 3.

Referring now to FIG. 7, an alternate embodiment 18*a* of switch 18 is shown. Switch 18*a* is used for GTO's 88 which cannot block reverse voltage. In switch 18*a*, GTO's 88 are connected cathode to anode. A conventional snubber circuit, including diode 90, resistor 92 and capacitor 94 is provided across each GTO 88 as previously described. Each GTO 88 is also provided with an anti-parallel diode 102 connected across it to prevent build-up of reverse voltage. Furthermore, each GTO 88 is provided with an additional series diode 104 to provide the reverse voltage blocking capability lacking within GTO 88. Power supplies 82, firing circuits 84 and current trips 86 may be similar to those described for switch 18.

Figure 8:
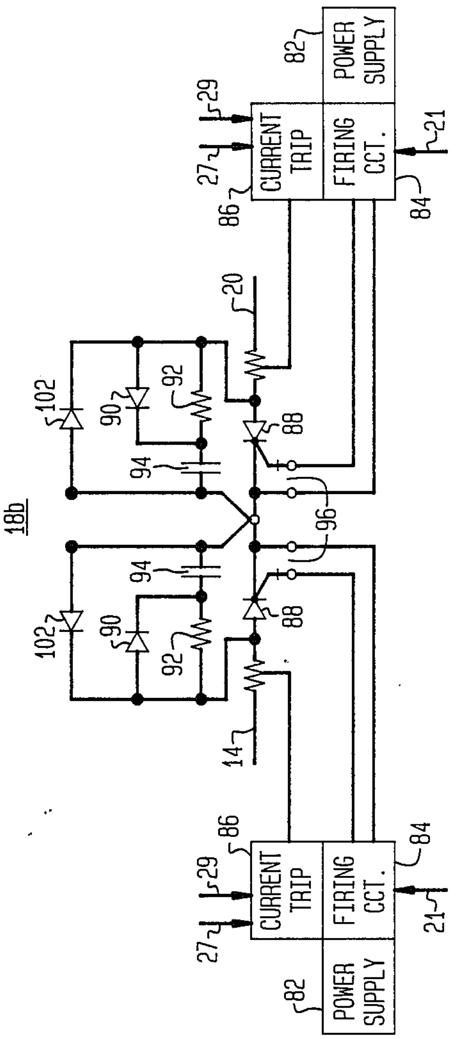
FIG. 8 is an alternate embodiment of the circuit of FIG. 3.

Referring now to FIG. 8 there is shown, switch 18*b* which is an additional alternate embodiment of switch 18. Switch 18*b* may be used when GTO's 88 lack reverse voltage blocking capability. In switch 18*b*, GTO's 88 are connected cathode to cathode and the series diode of switch 18*b* may then be omitted. Anti-parallel diodes 102 are provided as in switch 18*a* to prevent build-up of reverse voltage. Snubber circuits, power supplies 82, firing circuits 84, and current trips 86 are provided as previously described.

In system 10 the following components have been used for the operation and function as described and shown.

| Reference Numeral | Type |
|---|---|
| 84 | International Rectifier GK2B |
| 86 | Megatran Electronic Power G74024 |
| 88 | International Rectifier 160 PFT 140 |

It is claimed:

1. A method for controlling a substantially high power alternating source for supplying DC to the electrodes of an electrostatic precipitator, the alternating source providing a signal having cycles, peaks and zero crossings, comprising the steps of:
   (a) gating on and off the alternating source signal during the same half-cycle of the alternating source signal to provide a pulse wherein the gating off occurs at a time substantially different from the time of a zero crossing;
   (b) rectifying the pulse; and
   (c) applying the recitified pulse to the electrodes.

2. The method of claim 1 wherein step (a) includes gating on and gating off the source signal at times symmetrically positioned around a peak of the AC source signal.

3. The method of claim 1 wherein step (a) includes gating on the source signal before the peak and gating off the source signal after the peak.

4. The method of claim 3 wherein the time between gating on and gating off is selected to be substantially short for preventing arcing of the electrodes.

5. The method of claim 1 wherein step (a) further comprises gating off the source signal before a peak and gating on the source signal after the same peak wherein the gating off and the gating on occur during the same half cycle of the source signal.

6. The method of claim 1 wherein step (a) includes gating on and gating off the source signal a plurality of times during the half-cycle.

7. The method of claim 1 wherein step (a) includes gating by means of a gate turn-off thyristor.

8. A method for controlling a substantially high power alternating source for supplying DC to the electrodes of an electrostatic precipitator, the alternating source providing a signal having peaks and zero-crossings, comprising the steps of:
   (a) gating on the alternating source signal at a time which occurs a first predetermined period of time before a peak;
   (b) gating off the alternating source signal at a time which occurs a second predetermined period of time after the same peak and substantially before the next zero-crossing to produce a pulse;
   (c) rectifying the pulse; and,
   (d) applying the rectified pulse to the electrodes.

9. The method of claim 8 wherein steps (a) and (b) include gating by means of a gate turn off thyristor.

10. The method of claim 8 wherein the first and second predetermined periods of time are equal.

11. The method of claim 8 wherein the first and second predetermined periods of time are increased for providing additional energy to the electrodes.

12. The method of claim 8 wherein the first and second predetermined periods of time are selected to be substantially short for preventing arcing of the electrodes.

13. A method for controlling a substantially high power alternating source for supplying DC to the electrodes of an electrostatic precipitator, the alternating source providing a signal having zero-crossings and peaks, comprising the steps of:
   (a) gating off the alternating source signal at a time which occurs a first predetermined period of time before a peak;
   (b) gating on the alternating source signal at a time which occurs a second predetermined period of time after the same peak to produce a pulse wherein the gating off and the gating on occur during the same half cycle of the alternating source;
   (c) rectifying the pulse; and,
   (d) applying the rectified pulse to the electrodes.

14. The method of claim 13 wherein steps (a) and (b) include gating by means of a gate turn-off thyristor.

15. The method of claim 13 wherein the first and second predetermined periods of time are equal.

16. A method of claim 13 wherein the first and second predetermined periods of time are decreased for providing additional energy to the electrodes.

17. A method for controlling a substantially high power alternating source for supplying DC to the electrodes of an electrostatic precipitator, the alternating source providing a signal having cycles, peaks and zero crossings, comprising the steps of:
   (a) gating on and off the alternating source signal a plurality of times during the same half-cycle of the alternating source signal to provide a plurality of pulses;
   (b) rectifying the pulses; and
   (c) applying the rectified pulses to the electrodes.

18. The method of claim 17 wherein the gating means includes means for gating on and gating off the source signal at time symmetrically positioned around a peak of the AC source signal.

19. The method of claim 17 wherein the gating means includes means for gating on the source signal before the peak and gating off the source signal after the peak.

20. The method of claim 19 wherein the time between gating on and gating off is selected to be substantially short for preventing arcing of the electrodes.

21. The method of claim 17 wherein the gating means includes means for first gating on the source signal after a first peak and then gating off the source signal before a second peak wherein the second peak is the next peak after the first peak.

22. The method of claim 17 wherein the gating means includes means for gating on and gating off the source signal a plurality of times during the half-cycle.

23. The method of claim 17 wherein the gating means includes a gate turn-off thyristor.

24. The method of claim 17 wherein the gating means further comprises:
   first means for gating at time symmetrically positioned around peaks of the AC source signal for providing a first plurality of pulses;
   second means for gating at times symmentrically positioned around zero-crossings of the AC source signal for providing a second plurality of pulses; and
   means for combining the first and second plurality of pulses for providing a third plurality of pulses.

25. The method of claim 24 including means for inverting the third plurality of pulses.

26. The method of claim 24 including means for actuating the first and second gating means a plurality of times during a single half-cycle.

27. A system for controlling by way of switching means a substantially high power alternating source signal for supplying DC to the electrodes of an electrostatic precipitator, the switching means having an on state for providing source energy to the electrodes and an off state for preventing source energy from being applied to the electrodes, comprising means for changing the state of the switching means at least twice during the same half cycle of the alternating source signal to provide a pulse wherein the state changes occur at times substantially different from the times of the zero-crossings of the source signal;

means for rectifying the pulse, and, means for applying the recified pulse to the electrodes.

28. The system of claim 27 wherein the means for changing the state includes means for changing the state at times symmetrically positioned around a peak of the AC source signal.

29. The system of claim 27 wherein the means for changing the state includes means for changing to the on state before the peak and changing to the off state after the peak.

30. The system of claim 29 wherein the time between changing to the on state and changing to the off state is selected to be substantially short for preventing arcing of the electrodes.

31. The system of claim 27 wherein the means for changing the state includes means for changing to the on state after a first peak and changing to the off state before a second peak wherein the second peak is the next peak after the first peak.

32. The system of claim 27 wherein the means for changing the state includes means for changing the state a plurality of times during the half-cycle.

* * * * *